E. L. PETERSON.
PLATFORM TRUCK.
APPLICATION FILED JAN. 29, 1915.

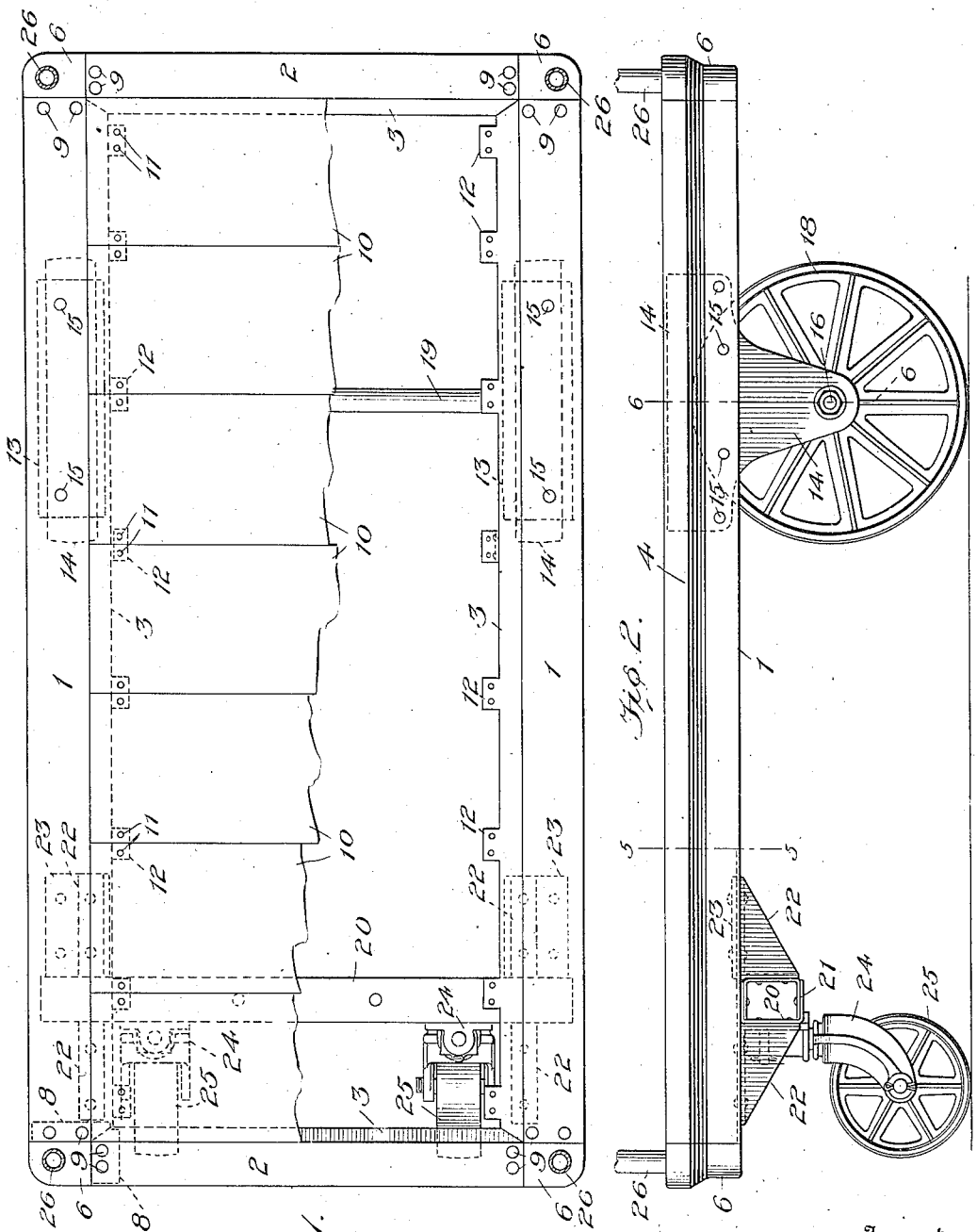

1,143,134.

Patented June 15, 1915.
2 SHEETS—SHEET 2.

Witnesses
Edwin L. Bradford
M. D. Ballauf

Inventor
Edwin L. Peterson,
By Wm. E. Dyre,
Attorney

UNITED STATES PATENT OFFICE.

EDWIN L. PETERSON, OF PITTSBURGH, PENNSYLVANIA, ASSIGNOR TO PRESSED STEEL TRUCK COMPANY, OF PITTSBURGH, PENNSYLVANIA, A CORPORATION OF WEST VIRGINIA.

PLATFORM-TRUCK.

1,143,134.   Specification of Letters Patent.   Patented June 15, 1915.

Application filed January 29, 1915. Serial No. 4,974.

*To all whom it may concern:*

Be it known that I, EDWIN L. PETERSON, a citizen of the United States, residing at Pittsburgh, in the county of Allegheny and State of Pennsylvania, have invented certain new and useful Improvements in Platform-Trucks; and I do hereby declare the following to be a full, clear, and exact description of the invention, such as will enable others skilled in the art to which it appertains to make and use the same.

My present invention relates to trucks, but more particularly to frame structures for four-wheel platform or freight-house trucks, dolly trucks, wagon trucks, or any other kind of a wheeled vehicle.

It has for an object the production of a truck frame made from sheet steel shaped in suitable formers or dies, and therefore quickly and economically produced.

As a further object this invention contemplates extreme simplicity of construction, lightness, strength and durability, these qualities being due in a large measure to the tubular formation of the pressed steel elements of which these frames are constructed.

Further objects and advantages will be apparent to persons skilled in the art to which the present invention relates, and particularly to employees of railroad, steamship and warehouse companies.

With these and other objects in view the invention generally stated, comprises a platform truck having side and end rails of tubular form joined at all four corners by suitable coupling members, recessed upon their inner edges to receive and support the truck flooring, and entirely surrounded by an integral projection or rib serving as an exterior guard or fender. Depending from the frame thus formed is a wheel-supporting bolster, and also suitable wheel lugs, in which latter are mounted the main wheels of the structure.

The invention, in its preferred form of construction, will now be particularly described and pointed out in the claims following.

Figure 3:
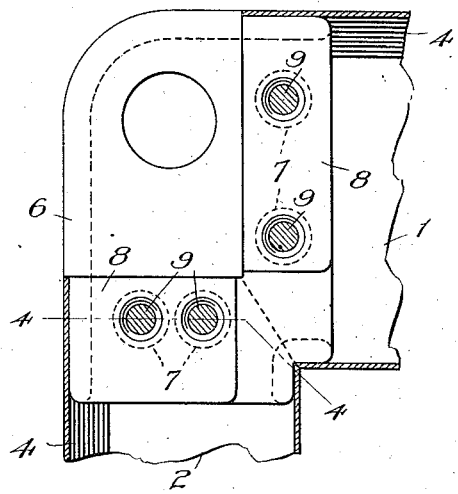
Figure 5:
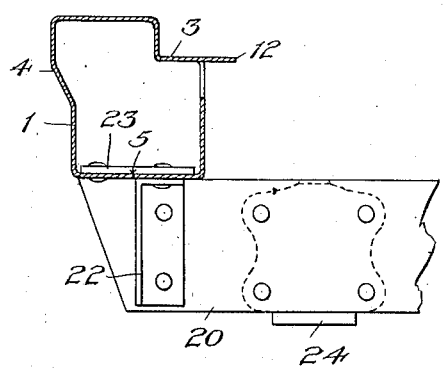
Figure 4:
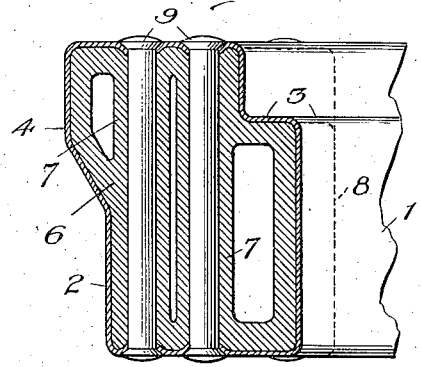
Figure 6:
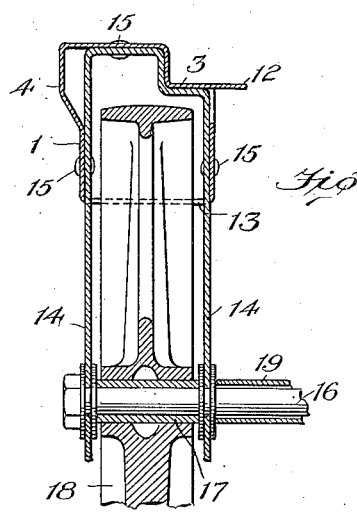
Figure 7:
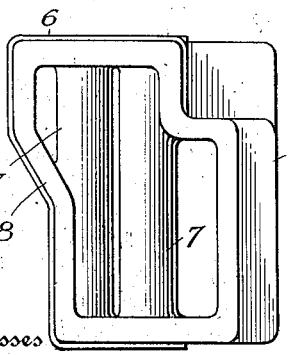
Figure 8:
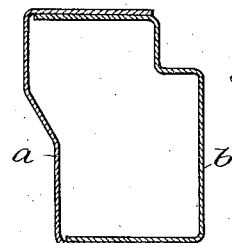

In the accompanying drawings which form part of this application for Letters Patent, and whereon like numerals indicate corresponding parts in the several views: Figure 1 is a top plan view of a platform truck embodying the present invention, but having its flooring broken away for purposes of illustration. Fig. 2 is a side elevation of the invention. Fig. 3 is a detail view showing in plan one cast corner connector, and in section fragments of one tubular side and one end rail secured to said corner or coupling element. Fig. 4 is a vertical sectional view taken on the line 4—4 of Fig. 3. Fig. 5 is a vertical transverse sectional view through one side rail, taken on the line 5—5, Fig. 2, but showing a fragment of a transversely arranged wheel-bolster in side elevation. Fig. 6 is also a vertical transverse sectional view through the center of one main truck wheel on the line 6—6, Fig. 2. Fig. 7 is a side elevation of one hollow cast corner connector for the side and end rails of truck frame, and Fig. 8 illustrates one modified plan of forming tubular end and side rails from a plurality of sheets.

Reference being had to the drawings and numerals thereon, 1 indicates the side sills and 2 the end sills of the truck frame. These elements are substantially alike in cross sectional contour as best shown in section by Fig. 4. The inside upper edge of each side and end sill is recessed or rabbeted throughout its entire length as at 3, and the outside upper edge of each throughout its length is projected as at 4, for purposes which will later appear. These sills 1 and 2, preferably of unitary formation, and of sheet steel, and of a gage best suited to the service expected of them, are shaped in suitable formers or dies, and are of tubular construction with edges abutting as shown at 5 in Fig. 5. At the frame corners the said sills are connected, or coupled together by agency of hollow castings 6, preferably of malleable iron, which are practically counterparts one of the other. In exterior configuration these corner coupling members conform exactly with the side and end sills which they join, that is to say, they are configured by a continuation of the inside recess or depression 3, and outside projection or rib 4. They are each also bisected by vertical tubular rivet-ways 7 having countersunk extremities above and below as best shown by Figs. 4 and 7; and the projecting ends of each are reduced as at 8 to receive the sill members and provide for a flush surface when the latter are secured in place.

In constructing the rectangular truck frame aforesaid the tubular side sills and end sills are first slipped over the reduced ends 8 of all corner couplings 6, thus forming flush outer and inner surfaces as shown by Figs. 1 and 3; whereupon the upper and lower ends of said sills are forcibly crimped into the countersunk extremities of rivet-ways 7, and there securely fastened by means of through bolts or rivets 9 as clearly shown by Fig. 4. Within the rectangular hollow truck frame, formed substantially as described, is then laid a platform, flush with the upper edges of sills 1 and 2, consisting of transversely arranged timbers, or sheet iron sections 10, the opposite ends of which are seated snugly in the sill depressions or recesses 3, and are there retained against the possibility of accidental displacement by means of bolts 11. These bolts 11 project downward through brackets 12 which latter are an integral part of the sills 1 and 2 as shown by Figs. 5 and 6, and are projected at right angles beneath the platform 10.

At suitable points upon opposite sides of the truck frame, both side sills 1, 1 are slotted or cut away longitudinally upon their under surfaces as indicated by dotted lines at 13 in Fig. 1, and through these openings are introduced wheel-lugs 14 of sheet steel and of substantially U-shape inverted. These double or bifurcated lugs 14 extend to the upper inside surface of sills 1, to the top and sides whereof they are rigidly riveted as at 15, and in the lower ends whereof is journaled a main axle 16 which therefore extends from side to side of the structure. Between the two parallel members of each lug 14, and surrounding axle 16, is provided a spacing sleeve 17 upon which is mounted the main truck-wheels 18; while in like manner between the inner member of opposite wheel lugs 14, and also surrounding axle 16, is a tubular spacing sleeve 19 for the evident purpose of stiffening the structure and relieving wheels 18 of possible binding.

Near its opposite end and below, the truck frame is provided with a transverse hollow bolster 20 which may be readily formed of a single sheet folded upon itself, or of two such sheets telescopically secured together as shown at 21. At its opposite ends said bolster is securely fastened beneath the truck frame by means of angular brackets 22 flanking it upon both sides, and riveted thereto as best shown by dotted lines in Fig. 1. While over at least one set of said brackets and within the tubular side sills 1 are secured reinforcing plates 23 as shown by Fig. 5.

To the face of bolster 20 are riveted or otherwise secured caster-brackets 24, in which are mounted caster-wheels 25 of any approved construction, those shown being no part of the present invention.

Rising from all four corners of the truck frame are removable tubular stanchions 26 which serve as a convenient means of steering and handling the truck, or assisting in the retention of merchandise thereon.

While the sills 1 and 2 are preferably of unitary construction as hereinbefore described, yet at the same time it is quite evident that substantially the same results would be obtained by making them in two telescoping sections $a$ and $b$, as shown by modified Fig. 8 of the drawings.

The use and operation of my improved truck is self-evident and need hardly be dwelt upon, although it may be noted with what facility the recessed or rabbeted inner edge 3 of the truck frame lends itself to the proper positioning and support of a flush truck platform, and at the same time materially reinforces the entire structure. Moreover, the same may be said of the reinforcing qualities of the outer surrounding projection 4, and in addition this is designed, arranged, and adapted to serve as a most effective fender or guard rail when the truck is in service.

The foregoing being a description of my invention in its preferred form of construction it will be understood that I do not limit myself to the particular form and arrangement of parts herein shown, and described, nor to any particular sheet metal or sheet metals employed, but, on the contrary herein lay claim to all such changes and modifications as fall within the spirit of this invention and scope of the following claims.

Having thus set forth my invention, what I now claim and desire to secure by Letters Patent is:

1. In a wheeled truck the combination with side and end sills uniformly recessed upon their inner edges and bearing upon their outer edges a projecting guard rib, of means for joining the ends of said sills to form a truck-frame, and a platform crossing said frame and secured in the recesses aforesaid.

2. In a wheeled truck the combination with tubular side and end sills, of hollow corner couplings inserted in the ends of said sills to form a truck frame, tubular rivet-ways bisecting said couplings, rivets in said rivet-ways for securing the sills and couplings in fixed relation, and a platform supported by said sills.

3. In a wheeled truck the combination with hollow side and end sills constituting a truck-frame, of a platform supported by said sills, wheel lugs depending from and secured between the walls of each side sill, an axle mounted in said lugs, and wheels journaled upon said axle.

4. In a wheeled truck the combination with hollow side and end sills constituting a truck frame, of a platform supported by said sills, oppositely disposed bifurcated wheel lugs depending from and secured between the walls of each side sill, an axle mounted in said wheel lugs, and a wheel journaled upon said axle between each pair of said bifurcated wheel lugs.

5. In a wheeled truck the combination with hollow side and end sills connected to form a rectangular truck-frame, of a platform supported by said sills, oppositely disposed dual wheel lugs depending from and secured between the walls of each side sill, a primary truck wheel mounted in each of said dual lugs, a hollow bolster crossing the frame transversely, and secondary wheels mounted upon said bolster.

6. In a wheeled truck the combination with hollow side and end sills connected to form a rectangular truck-frame, of a platform supported by said sills, oppositely disposed U-shaped wheel lugs depending from and secured between the walls of each side sill, a primary truck wheel mounted in each of said U-shaped lugs, a tubular bolster crossing the frame transversely, and secondary caster wheels pivotally mounted upon said bolster.

7. In a wheeled truck the combination with sheet metal side and end sills, of corner couplings pierced by rivet holes having countersunk ends for connecting the ends of said sills to form a truck frame, countersunk rivets for securing said sills and couplings in fixed relation, and a platform supported upon said sills.

8. In a wheeled truck the combination with sheet metal side and end sills, of corner couplings pierced by rivet holes into which said sills are crimped, countersunk rivets for securing said sills and couplings in fixed relation, and a platform supported upon said sills.

In testimony whereof I affix my signature, in presence of two subscribing witnesses.

EDWIN L. PETERSON.

Witnesses:
P. R. SMITH,
H. E. McKILVEY.